United States Patent [19]

Mauthe

[11] Patent Number: 4,982,317
[45] Date of Patent: Jan. 1, 1991

[54] INTEGRATED VOLTAGE MULTIPLIER CIRCUIT FOR LOW SUPPLY VOLTAGE

[75] Inventor: Manfred Mauthe, Munich, Fed. Rep. of Germany

[73] Assignee: Siemens Aktiengesellschaft, Berlin and Munich, Fed. Rep. of Germany

[21] Appl. No.: 411,923

[22] Filed: Sep. 25, 1989

[30] Foreign Application Priority Data

Oct. 13, 1988 [DE] Fed. Rep. of Germany ....... 3834927

[51] Int. Cl.⁵ .......................................... H02M 3/18
[52] U.S. Cl. ....................................... 363/60; 363/59; 307/110
[58] Field of Search .................... 307/110; 363/59, 60

[56] References Cited

U.S. PATENT DOCUMENTS

| | | | |
|---|---|---|---|
| 3,790,812 | 2/1974 | Fry | 307/110 |
| 3,824,447 | 7/1974 | Kuwabara | 363/60 |
| 4,061,929 | 12/1977 | Asano | 363/60 |
| 4,106,086 | 8/1978 | Holbrook et al. | 363/60 |
| 4,199,806 | 4/1980 | Patterson | 363/60 |
| 4,271,461 | 6/1981 | Hoffmann et al. | 363/60 |
| 4,302,804 | 11/1981 | Bader | 363/60 |
| 4,321,661 | 3/1982 | Sano | 307/110 |
| 4,344,003 | 8/1982 | Harmon et al. | 363/60 |
| 4,460,952 | 7/1984 | Risinger | 307/110 |
| 4,616,303 | 10/1986 | Mauthe | 307/110 |
| 4,621,315 | 11/1986 | Vaughn et al. | 363/60 |
| 4,663,701 | 5/1987 | Stotts | 363/60 |
| 4,792,886 | 12/1988 | Sahm | 363/60 |
| 4,839,787 | 6/1989 | Kojima et al. | 307/110 |

FOREIGN PATENT DOCUMENTS

3335423 4/1988 Fed. Rep. of Germany .

OTHER PUBLICATIONS

"A 1.5 V. Single-Supply One-Transistor CMOS EEPROM", by B. Gerber, IEEE Journal of Solid-State Circuits, vol. SC-16, No. 3, Jun. 1981, pp. 195-199.

"A Set of 4 IC's In CMOS Technology for a Programmable Hearing Aid", by F. Callias et al, IEEE 1988 Custom Integrated Circuits Conference, No. 5, pp. 2-5, May 1988.

"Inductance-Less Up dc-dc Convertor", by S. Singer, IEEE Journal of Solid-State Circuits, vol. SC-17, No. 4, Aug. 1982, pp. 778-781.

"On-Chip High-Voltage Generation In MNOS Integrated Circuits Using An Improved Voltage Multiplier Technique", by J. F. Dickson, IEEE Journal of Solid-State Circuits, vol. SC-11, No. 3, Jun. 1976, pp. 374-378.

*Primary Examiner*—Peter S. Wong
*Assistant Examiner*—Jeffrey Sterrett
*Attorney, Agent, or Firm*—Hill, Van Santen, Steadman & Simpson

[57] ABSTRACT integrated voltage multiplier circuit for low supply voltage. In order to improve the signal-to-noise ratio in battery-operated switched capacitor filter circuits in hearing aids, the range of modulation can be increased by doubling the supply voltage. A circuit for voltage multiplication in CMOS technology generates a negative voltage for a given voltage. In order to be able to utilize both clock phases, a two-stage embodiment is selected, both of these working onto a smoothing capacitor. The voltage multiplier circuit is driven by a fourth inverter stage and with a level converter having a connected, third inverter stage.

23 Claims, 2 Drawing Sheets

INTEGRATED VOLTAGE MULTIPLIER CIRCUIT FOR LOW SUPPLY VOLTAGE

BACKGROUND OF THE INVENTION

The present invention is directed to a circuit for voltage multiplication of the type having a level converter connected to an inverter stage with a first stage containing a first capacitor, a first inverter stage and first and second transistors.

Hearing aids of the prior art contain a plurality of individual components such as, for example, low-noise preamplifiers, switched capacitor filter circuits as well as a voltage supply part. In order to improve the signal-to-noise ratio in battery-operated "switched capacitor" filter circuits (SC filter circuits), the modulation range of the filter circuit can be increased by doubling the supply voltage. The supply voltage of hearing aids usually is in the range of 1–1.5 volts, so that a doubling to 2–3 volts with additional battery cells causes additional difficulties because of the spatially tight conditions in a hearing aid housing.

The technical literature discloses a number of voltage multiplier circuits specifically for the hearing aid field such as, for example, "a 1.5 volt single-supply one-transistor CMOS EEProm" by B. Gerber et al, IEEE, Sc-16, No. 3, June 1981, pages 195–199 and "On Chip High Voltage Generation In NMOS-Integrated Circuits Using An Improved Voltage Multiplier Technique", by John F. Dickson, IEEE, Sc-11, No. 3, June 1976, pages 374–378, as well as "Inductance-Less Up DC-DC Converter", by S. Singer, IEEE Sc-17, No. 4, August 1982, pages 778 through 780. All of these prior art voltage multiplier circuits use diodes or transistors connected as diodes. A voltage multiplier circuit for low voltages, however, is advantageously constructed with transistor circuits. Since a diode only becomes conductive when the threshold voltage is exceeded, the supply voltage must lie above this threshold voltage by a multiple in such a circuit in order for a voltage boost to occur. By contrast, a transistor in an on-state can be viewed as a low-impedance resistor along which no voltage drop is present after a charge balancing has occurred. German Patent Application Serial No. P 33 45 423.5 "Schaltung Zur Spannungsvervielfachung" discloses a voltage multiplier circuit in CMOS technology. For a given voltage, this circuit generates a positive voltage in loss-free no-load operation that is twice as high.

FIG. 3 in the publication of F. Callias et al, "A Set of 4 IC's in CMOS-Technology for a programmable hearing aid", IEEE, 1988, Custom Integrated Circuit Conference, pages 2–5, discloses a voltage tripling circuit in CMOS technology wherein a negative voltage is generated for a given positive voltage. In FIG. 3 of the publication, the voltage tripling circuit has a level converter, a drive circuit and a three-stage capacitor network, whereby the drive circuit is connected between the level converter and the three-stage capacitor network.

SUMMARY OF THE INVENTION

An object of the present invention is to provide a circuit in CMOS technology that generates a negative voltage for a given voltage. This is inventively achieved by a multi-stage voltage multiplier circuit having a level converter connected to an inverter stage, the multi-stage voltage multiplier circuit having a first stage containing a first capacitor, a first inverter stage, and first and second field effect transistors of a first type. A first terminal of the first capacitor is connected to an output of the first inverter stage and a second terminal of the first capacitor is connected to ground via the first field effect transistor of the first type. The second terminal of the first capacitor is also connected to a second reference potential via the second field effect transistor of the first type and the first inverter stage is connected between the first reference potential and ground. An input of the first inverter stage forms an input of the first stage and a gate terminal of the first field effect transistor of the first type forms a first control input and a gate terminal of the second field effect transistor of the first type forms a second control input of the first stage. A substrate terminal of the first field effect transistor of the first type is connected to the second terminal of the first capacitor and a substrate terminal of the second field effect transistor of the first type is connected to the second reference potential. The multi-stage voltage multiplier circuit comprises a second stage having a second capacitor, a second inverter stage, a third and fourth field effect transistors of the first type. A first terminal of the second capacitor is connected to an output of the second inverter stage and a second terminal of the second capacitor is connected to ground via the third field effect transistor of the first type. The second terminal of the second capacitor is also connected to the second reference potential via the fourth field effect transistor of the first type and the second inverter stage is connected between the first reference potential and ground. An input of the second inverter stage forms an input of the second stage, a gate terminal of the third field effect transistor of the first type is a third control input and a gate terminal of the fourth field effect transistor of the first type is a fourth control input. A substrate terminal of the third field effect transistor of the first type is connected to the second terminal of the second capacitor and a substrate terminal of the fourth field effect transistor of the first type is connected to the second reference potential. A clock output of the level converter is connected to an input of a third inverter stage and to the first control input and fourth control input, and the second control input and third control input is connected to an output of the third inverter stage. The input of the first stage is connected to an output of a fourth inverter stage and the input of the second stage is connected to an input of the fourth inverter stage and to a clock input of the level converter. The fourth inverter stage is connected between the first reference potential and ground. The input of the fourth inverter stage forms a clock input of the multi-stage voltage multiplier circuit. The third inverter stage is connected between an output of the voltage multiplier circuit and the first reference potential. The level converter is connected to the first and second reference potentials and to ground. The output of the two-stage voltage multiplier circuit is connected to the second reference potential.

The advantage obtainable with the present invention is that both clock phases can be utilized in one realization thereof. The power yield is thereby increased and the voltage change is reduced during a clock phase at a smoothing capacitor.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
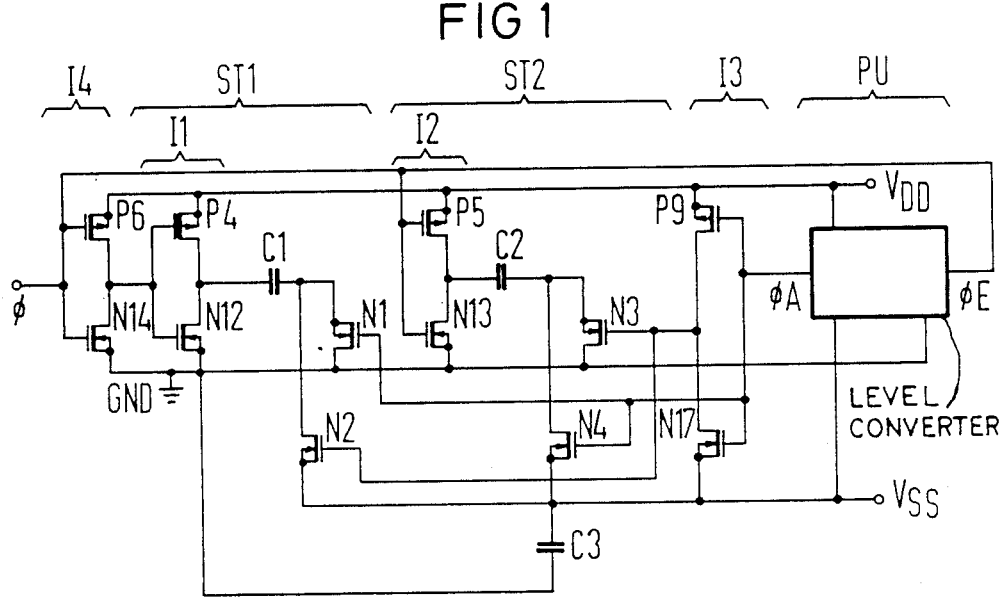
FIG. 1 is a circuit diagram of the present invention for voltage multiplication in a two-stage embodiment.

The voltage multiplication circuit of the present invention according to FIG. 1 contains a first and second stage ST1, ST2 that are driven by a fourth inverter stage I4 as well as of a level converter PU having connected thereto a third inverter stage I3. Each of the two stages contains an inverter circuit, a capacitor and a two-channel field effect transistors. The capacitor has a first terminal connected to the output of the inverter stages and has a second terminal connected to ground GND via one of the two n-channel field effect transistors. The further transistor is connected between a second reference potential $V_{ss}$ and the second terminal of the capacitor, whereby the second reference potential $V_{ss}$ is connected to the output of the voltage multiplier circuit.

The supply voltage is connected between the ground GND and the lead having the first reference potential $V_{DD}$, whereas a voltage at the second reference potential having $V_{ss} = -V_{DD}$ (with reference to ground GND) can be generated by the voltage multiplier circuit. To this end, the capacitor has its first terminal connected to the first reference potential $V_{DD}$ during the first clock phase and has its second terminal simultaneously connected to ground GND via one of the two field effect transistors. In the following clock phase, this transistor is inhibited and the first terminal is discharged from the first reference potential $V_{DD}$ to ground GND via the inverter stage, so that the second terminal drops from ground GND to $-V_{DD}$. During this clock phase, the field effect transistor connected between the second terminal and the second reference potential $V_{ss}$ is conductive and transfers the charge from the capacitor C1 onto a further smoothing capacitor C3. This smoothing capacitor is connected between the second reference potential $V_{ss}$ and ground GND.

The recited cycle is repeated with the next clock period and the reference potential $V_{ss}$ becomes more and more negative until the voltage $-V_{DD}$ is reached. While the capacitor C1 in the first stage is now charged in the first clock period, the capacitor C2 in the second stage that is already charged can output its charge to the smoothing capacitor. This makes it possible to utilized both clock phases, this increasing the current yield and reducing the voltage change at the smoothing capacitor C3 during a clock phase. The voltage between the second terminal point of the capacitor C1 and the second reference potential $V_{ss}$ moves between 0 volts (ground GND) and $-V_{DD}$. The two field effect transistors in the respective first and second stage must thus be driven such that they are reliably inhibited for a voltage of $-V_{DD}$. This is the case when the gate terminal voltage is less than the voltage of $-V_{DD}+V_{Tn}$. The voltage $V_{Tn}$ thereby references the threshold voltage of an n-channel field effect transistor. The low level is shifted from ground GND to the second reference potential $V_{ss} = -V_{DD}$ with the level converter PU and the connected, third inverter circuit I3. This occurs when the level converter PU has its output side supplied by the generated voltage $V_{ss}$. In general, it can be assumed that the smoothing capacitor C3 is discharged upon turn-on, since an ohmic load in the form of a user is also connected to it in parallel. The level converter then operates immediately and a voltage multiplication is achieved.

In detail, the voltage multiplier circuit of FIG. 1 is constructed in the following way. The first stage ST1 of the voltage multiplier circuit contains a first inverter stage I1, a first capacitor C1 and first and second n-channel field effect transistors N1 and N2. The output of the first inverter stage I1 is connected to a first terminal of the capacitor C1 and the second terminal of the capacitor C1 is connected to ground GND via the first n-channel field effect transistor N1. The appertaining substrate terminal to the first n-channel field effect transistor N1 is likewise connected to the second terminal of the capacitor. Further, the second n-channel field effect transistor N2 is connected between the second terminal of the capacitor C1 and a first terminal of the smoothing capacitor C3. The substrate terminal of this latter field effect transistor is also connected to the first terminal of the smoothing capacitor C3. The smoothing capacitor C3 itself has its second terminal connected to the ground GND and sees a low ripple of the output voltage. The inverter stage I1 contains a fourth p-channel field effect transistor P4 and a twelfth n-channel field effect transistor N12, whereby the two gate terminals are connected in common to the output of the fourth inverter stage I4 and both first terminals form the output of the first inverter stage in common. In the inverter stage I1, further, the substrate terminal and the second terminal of the twelfth n-channel field effect transistor N12 are connected to the ground GND and the second terminal and substrate terminal of the fourth p-channel field effect transistor P4 are connected to the first reference potential $V_{DD}$.

The second stage ST2 is constructed similar to the first stage ST1 and contains a second inverter stage I2 formed by a fifth p-channel field effect transistor P5 and of a thirteenth n-channel field effect transistor N13, of a capacitor C2 and of the third and fourth n-channel field effect transistor N3 and N4. The capacitor C2 is also connected between the output of the inverter stage I2 and is connected to ground GND via the third n-channel field effect transistor N3 and is connected to the second reference potential $V_{ss}$ via the n-channel field effect transistor N4. The two gate terminals of the fifth p-channel field effect transistor P5 and of the thirteenth n-channel field effect transistor N13 the second inverter stage I2 form the input of the second inverter stage I2 and, contrasting to the first inverter stage I1, are connected to the input of the fourth inverter stage I4.

For driving the two stages ST1 and ST2 via the inverter I4, the latter has a sixth p-channel field effect transistor P6 and a fourteenth n-channel field effect transistor N14 available, whereby the substrate terminal and a first terminal of the n-channel field effect transistor N14 are connected to ground GND and a first terminal and a substrate terminal of the sixth p-channel field effect transistor P6 is connected to the first reference potential $V_{DD}$, whereas the two gate terminals of these latter field effect transistors form the input of the fourth inverter stage I4 and the clock input $\phi$. The output of the fourth inverter stage I4 is formed by the second terminals of the respectively sixth p-channel field effect transistor P6 and of the respectively fourteenth n-channel field effect transistor N14.

The level converter circuit PU is connected to the input of the fourth inverter stage I4 or, respectively, to the clock input $\phi E$, to the ground GND, to the first reference potential $V_{DD}$ and to the second, generated reference potential $V_{ss}$ and further has its clock output $\phi A$ connected to the two gate terminals of the ninth n-channel field effect transistor N9 and of the seventeenth p-channel field effect transistor P17. Both field effect transistors form the third inverter stage I3. A substrate terminal and a first terminal of the ninth p-channel field effect transistor P9 is thereby connected to the first reference potential $V_{DD}$ and a first terminal and substrate terminal of the seventeenth n-channel field effect transistor N17 are connected to the second reference potential $V_{ss}$. The output of the third inverter stage I3 is formed by the two terminals of these two latter field effect transistors and is connected to the gate terminal of the third n-channel field effect transistor N3 and to the gate terminal of the second n-channel field effect transistor N2. Further, the gate terminal of the first n-channel field effect transistor N1 and the gate terminal of the fourth n-channel field effect transistor N4 is to be connected to the clock output $\phi A$ of the level converter PU.

Figure 2:
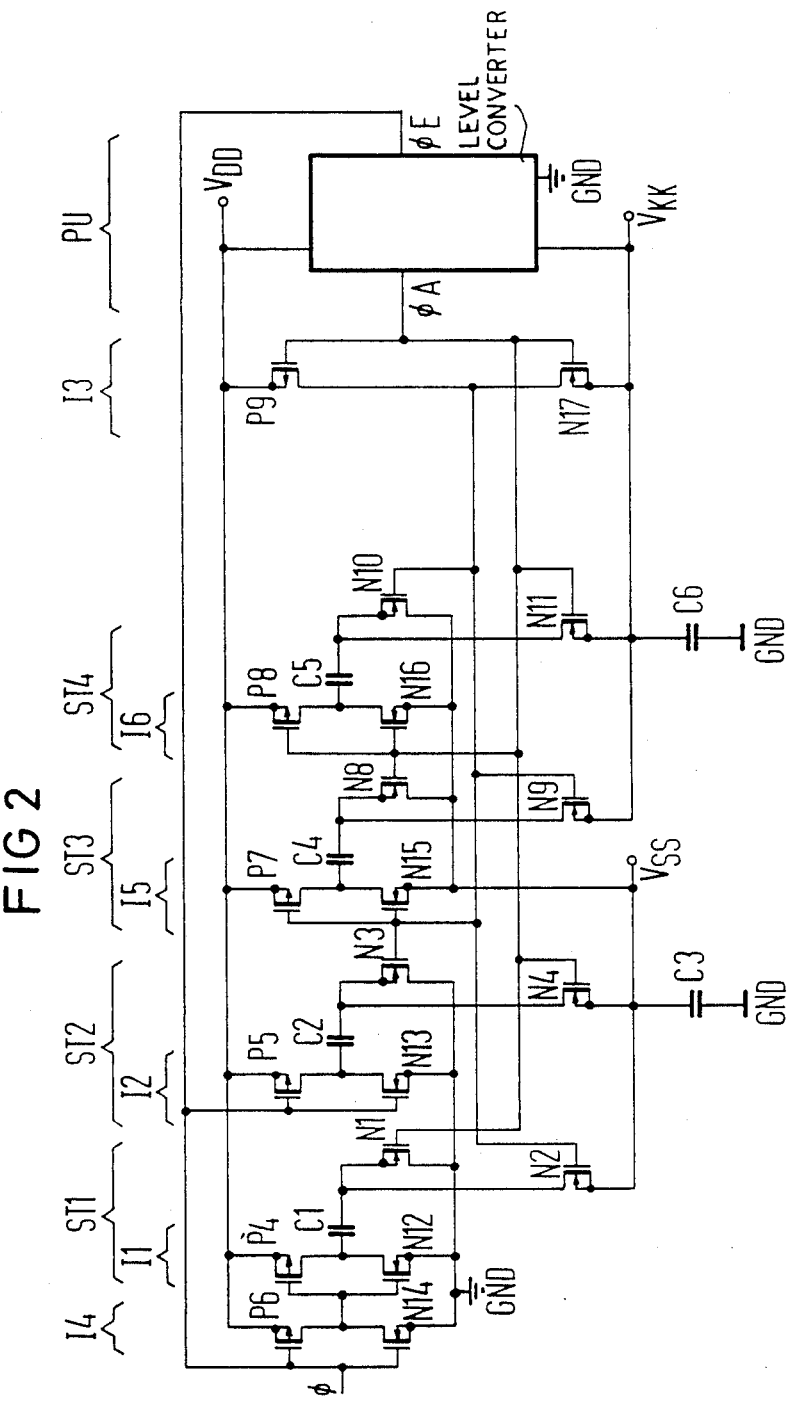
FIG. 2 is a further circuit diagram of the present invention for voltage multiplication in a four-stage embodiment.

When, instead of a voltage doubling, a multiple boost of the voltage is desired, then more than two stages are to be connected following one another. A four-stage circuit that generates the output voltage $V_{KK} = -3 \times V_{DD}$ is shown in FIG. 2. The level converter PU for driving the individual stages via the third inverter I3 is required only once and is therefore connected to the most negative voltage, in this case $V_{KK}$. The interconnection of the individual stages ST1 and ST2, their realization, and the realization of the inverter stages I3 and I4 is to be undertaken as in the two-stage voltage multiplier circuit of FIG. 1. Components identical to those in FIG. 1 are provided with the same reference characters in the four-stage embodiment of the voltage multiplier circuit.

The structure of the third and fourth stage ST3 and ST4 is similar to that of the two first stages ST1 and ST2. The third stage ST3 contains an inverter stage I5 a capacitor C4 as well as two n-channel field effect transistors N8 and N9. A first terminal of the fourth capacitor C4 is connected to an output of the fifth inverter stage I5 and a second terminal thereof is connected to the second reference potential $V_{ss}$ via the eighth n-channel field effect transistor N8. The substrate terminal of the eighth n-channel field effect transistor N8 is likewise connected to the second terminal of the capacitor C4. The ninth n-channel field effect transistor N9 is connected between the third reference potential $V_{KK}$, which represents the most negative voltage in the circuit of FIG. 2, and the second terminal of the fourth capacitor C4, whereby the substrate terminal of the ninth n-channel field effect transistor N9 is likewise connected to $V_{KK}$. The inverter stage I5 is again constructed by two complementary field effect transistors P7 and N15, whereby a first terminal of P7 and N15 form the output of the inverter stage I5 and the gate terminals of both field effect transistors represent the input of the fifth inverter stage I5 that is to be connected, first, to the gate terminals of the n-channel field effect transistor N3, the n-channel field effect transistor N9 and the n-channel field effect transistor N2 and, second, to the output of the fifth inverter stage I3. Further, the inverter stage I5 is connected between the first reference potential $V_{DD}$ and the second reference potential $V_{ss}$, whereby the second terminal and the substrate terminal of the p-channel field effect transistor P7 is connected to the first reference potential $V_{DD}$ and the substrate terminal and second terminal of the n-channel field effect transistor N15 is connected to the second reference potential $V_{ss}$. The structure of the fourth stage ST4 connected to the third stage ST3 is similar. It is composed of the sixth inverter stage I6 of the fifth capacitor C5 and of the two n-channel field effect transistors N10 and N11. The first terminal of the capacitor C5 is in turn connected to the output of the sixth inverter stage I6 and the second terminal of the capacitor C5 is connected to the first reference potential $V_{ss}$ via the tenth n-channel field effect transistor N10. The substrate terminal is likewise connected to the second terminal of the capacitor C5 and the second terminal is connected to the third reference potential $V_{KK}$ via the n-channel field effect transistor N11. The substrate terminal of the same field effect transistor is also connected to the third reference potential $V_{KK}$. An analogous capacitor C3 in the first and second stage is represented by the capacitor C6 for the two stages ST3 and ST4, being connected between the ground GND and the third reference potential $V_{KK}$. Both capacitors C3 and C6 serve the purpose of smoothing the output signal and are not absolutely required for a connected user having capacitative characteristics. The sixth inverter stage I6 contains a n-channel and a p-channel field effect transistor P8 and N16, whereby the substrate terminal and the first terminal of N16 is connected to the second reference potential $V_{ss}$ and the first terminal and substrate terminal of P8 is connected to with the first reference potential $V_{DD}$. The two gate terminals of P8 and N16 are to be connected to the gate terminal of the eighth n-channel field effect transistor N8 and to the gate terminals of N1, N4 and N11. The output of the sixth inverter stage I6 is respectively formed in common from the second terminal of P8 and N16. For driving the n-channel field effect transistors N1 through N4 and N8 through N11, the gate terminals are to be connected to the output of the third inverter stage I3 or, respectively, to the clock output $\phi A$ of the level converter. These transistors must be driven such that they are reliably inhibited for a voltage of $-3 V_{DD}$. This is reliably the case when their gate terminal voltage is less than the voltage of $-3 \times V_{DD} + V_{TN}$ ($V_{TN}$ again references the threshold voltage of an n-channel field effect transistor). The low level is shifted from ground GND toward $V_{KK} = 3 \times -V_{DD}$ with the level converter PU. This occurs in that the level converter has its output side supplied by the generated voltage $V_{KK}$. In detail, the clock output $\phi A$ of the level converter is connected to the gate terminal of the first n-channel field effect transistor N1, to that of the fourth n-channel field effect transistor N4, to that of the eighth n-channel field effect transistor N8 and to the gate terminal of the eleventh n-channel field effect transistor N11. The input of the sixth inverter stage I6 is also connected to the clock output $\phi A$ of the level converter. The gate terminal of the second n-channel field effect transistor N2, the gate terminal of the third n-channel field effect transistor N3, the gate terminal of the ninth and that of the tenth n- channel field effect transistor N9 and N10 are connected to the output of the third inverter stage I3. The input of the fifth inverter stage I5 is also connected to the output of the third inverter I3.

The output of this four-stage voltage multiplier circuit is connected to the third reference potential $V_{KK}$, whereby a voltage of $V_{KK} = -3 \times V_{DD}$ appears at this third reference potential. A voltage $V_{ss} = -V_{DD}$ is built up in the first two stages ST1, this voltage being forwarded to the third and fourth stage ST3 and ST4 and, ultimately, generating the voltage $V_{KK} = -3 \times V_{DD}$. The realization of the level converter PU that is used in the voltage multiplier circuits of FIGS. 1 and 2 is described in the following FIG. 3.

Figure 3:
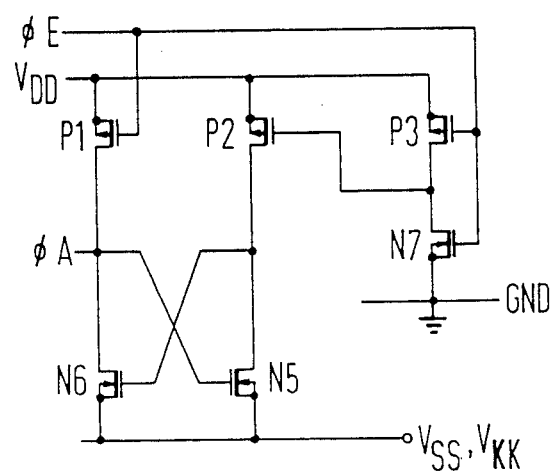
FIG. 3 is a circuit diagram of a level converter for operating the voltage multiplier circuits of the present invention.

The level converter PU of FIG. 3 contains three n-channel field effect transistors N5, N6 as well as N7, as well as three p-channel field effect transistors P1, P2 and P3. The p-channel field effect transistor P3 and the n-channel field effect transistor N7 are connected as an inverter and the two n-channel field effect transistors N5 and N6 form a bistable circuit. The clock alternates between a positive voltage (for example, $V_{DD}$) and the ground GND equals zero volts, so that a positive voltage signal is present at the gate terminal of the p-channel field effect transistor P1 during the first half of a clock period and the field effect transistor is inhibited. The p-channel field effect transistor P2, by contrast, is in the conductive condition since it has its gate terminal driven inversely with the same clock via the inverter stage formed by P3 and N7. The gate terminal of the n-channel field effect transistor N6 is now connected to a positive voltage $V_{DD}$ via the p-channel field effect transistor P2, so that P6 is conductive and applies the output $\phi A$ of the level converter to the voltage $V_{ss}$ or, respectively, $V_{KK}$. In this case, the n-channel field effect transistor N5 is in its inhibited condition. In the second half of the clock period, the voltage on the clock line $\phi E$ is 0 volts and the field effect transistor P1 is conductive. Since the clock line is also connected to the field effect transistors P3 and N7, the p-channel field effect transistors P3 is conductive and the n-channel field effect transistor N7 is inhibited in this case. The gate terminal of the P2 field effect transistor is therefore also applied to a positive voltage $V_{DD}$ and inhibits the transistor. In this case, the positive voltage $V_{DD}$ is situated at the clock output $\phi A$ and at the gate terminal of the n-channel field effect transistor N5. The n-channel field effect transistor N5 is conductive and thus inhibits the sixth n-channel field effect transistor N6 since the negative reference potential $V_{ss}$ or $V_{KK}$ is connected its gate line. A square-wave voltage derives therefrom at the clock output $\phi A$, this alternating between the first reference potential $V_{DD}$ and the respectively second or, respectively, third reference potential $V_{ss}$, $V_{KK}$ in the clock of the square-wave voltage on the clock line.

In detail, the wiring of the level converter is to be undertaken in the following way. A first terminal and a substrate terminal of the fifth n-channel field effect transistor N5 and a first terminal and substrate terminal of the sixth n-channel field effect transistor N6 are connected in common to the output of the voltage multiplier circuit or, respectively, to the second or third reference potential $V_{ss}$, $V_{KK}$ and a gate terminal of the fifth n-channel field effect transistor N5, a second terminal of the sixth n-channel field effect transistor N6 and a first terminal of the first p-channel field effect transistor P1 form the clock output $\phi A$ of the level converter in common. A gate terminal of the sixth n-channel field effect transistor N6 is connected to a second terminal of the fifth n-channel field effect transistor N5 and to a first terminal of the second p-channel field effect transistor P2 and a first terminal and substrate terminal of the seventh n-channel field effect transistor are to be applied to ground GND. A second terminal of the same transistor is connected to the gate terminal of the second p-channel field effect transistor P2 and to a first terminal of the third p-channel field effect transistor P3 and a second terminal and substrate terminal of the third p-channel field effect transistor P3, a second terminal and substrate terminal of the second p-channel field effect transistor P2 and a second terminal and substrate terminal of the first p-channel field effect transistor P1 are connected to the first reference potential $V_{DD}$. The drive occurs via the clock line at the clock input $\phi E$, whereby the gate terminal of the third p-channel field effect transistor P3 and the gate terminal of the seventh n-channel field effect transistor N7 are to be connected to the clock line.

When generating positive voltage with a given negative voltage, all n-channel and p-channel field effect transistors in the voltage multiplier circuits of FIGS. 1 and 2 are to be interchanged, whereby the first reference potential $V_{DD}$ is to be provided with a negative voltage and the second and the third reference potential $V_{ss}$, $V_{KK}$ supply a positive voltage.

The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A multi-stage voltage multiplier circuit having a level converter (PU), the multi-stage voltage multiplier circuit having a first stage (ST1) containing a first capacitor (C1), a first inverter stage (I1), and first and second field effect transistor (N1, N2) of a first type, whereby a first terminal of the first capacitor (C1) is connected to an output of the first inverter stage (I1) and a second terminal of the first capacitor (C1) is connected to ground (GND) via the first field effect transistor of the first type (N1), whereby the second terminal of the first capacitor (C1) is also connected to a second reference potential ($V_{ss}$) via the second field effect transistor of the first type (N2) and the first inverter stage (I1) is connected between the first reference potential ($V_{DD}$) and ground (GND), whereby an input of the first inverter stage (I1) forms an input of the first stage and a gate terminal of the first field effect transistor of the first type (N1) form a first control input and a gate terminal of the second field effect transistor of the first type (N2) forms a second control input of the first stage, whereby a substrate terminal of the first field effect transistor of the first type (N1) is connected to the second terminal of the first capacitor (C1) and a substrate terminal of the second field effect transistor of the first type (N2) is connected to the second reference potential ($V_{ss}$), comprising a second stage (ST2) having a second capacitor (C2), a second inverter stage (I2), and third and fourth field effect transistors of the first type (N3, N4); a first terminal of the second capacitor (C2) connected to an output of the second inverter stage (I2) and a second terminal of the second capacitor (C2) connected to ground (GND) via the third field effect transistor of the first type (N3); the second terminal of the second capacitor (C2) also connected to the second reference potential ($V_{ss}$) via the fourth field effect transistor of the first type (N4) and the second inverter stage (I2) connected between the first reference potential ($V_{DD}$) and ground (GND); an input of the second inverter stage (I2) forming an input of the second stage, a gate terminal of the third field effect transistor of the first type (N3) being a third control input and a gate terminal of the fourth field effect transistor of the first type (N4) being a fourth control input; a substrate terminal of the third field effect transistor of the first type (N3) connected to the second terminal of the second capacitor (C2) and a substrate terminal of the fourth field effect transistor of the first type (N4) connected to the second reference potential ($V_{ss}$); a clock output ($\phi A$) of the level converter (PU) connected to an input of a third inverter stage (I3) and to the first control input and fourth control input, and the second control input and third control input connected to an output of the third inverter stage (I3); the input of the first stage (ST1) connected to an output of a fourth inverter stage (I4) and the input of the second stage (ST2) connected to an input of the fourth inverter stage (I4) and to a clock input ($\phi E$) of the level converter (PU); the fourth inverter stage (I4) connected between the first reference potential ($V_{DD}$) and ground (GND); the input of the fourth inverter stage (I4) forming a clock input ($\phi$) of the multi-stage voltage multiplier circuit; the third inverter stage (I3) connected between an output of the voltage multiplier circuit and the first reference potential ($V_{DD}$); the level converter (PU) connected to the first and second reference potential ($V_{DD}$, $V_{ss}$) and to ground (GND); and the output of the two-stage voltage multiplier circuit connected to the second reference potential ($V_{ss}$).

2. The multi-stage voltage multiplier circuit according to claim 1, wherein a third capacitor (C3) for smoothing is connected between ground (GND) and the second reference potential ($V_{ss}$).

3. The multi-stage voltage multiplier circuit according to claim 1, wherein the first and second stages (ST1, ST2) are followed by third and fourth stages (ST3, ST4); wherein the third and fourth stages (ST3, ST4) have fifth and sixth inverter stages (I5, I6), an eighth, ninth, tenth and eleventh field effect transistor of the first type (N8, N9, N10 and N11) and fourth and fifth capacitors (C4, C5); wherein the second and third control inputs are connected to an input of the fifth inverter stage (I5) and the first and fourth control terminals are connected to an input of the sixth inverter stage (I6); wherein the fifth and sixth inverter stages are each connected between the first reference potential ($V_{DD}$) and the second reference potential ($V_{ss}$); wherein the fourth capacitor (C4) has a first terminal connected to an output of the fifth inverter stage (I5) and has a second terminal connected to the second reference potential ($V_{ss}$) via the eighth field effect transistor of the first type (N8); wherein the fifth capacitor (C5) has a first terminal connected to an output of the sixth inverter stage (I6) and has a second terminal connected to the second reference potential ($V_{ss}$) via the tenth field effect transistor of the first type (N10); wherein a substrate terminal of the eighth field effect transistor of the first type (N8) is connected to the second terminal of the fourth capacitor (C4) and a substrate terminal of the tenth field effect transistor of the first type (N10) is connected to the second terminal of the fifth capacitor (C5); wherein the ninth field effect transistor of the first type (N9) is connected between the fourth capacitor (C4) and a third reference potential ($V_{KK}$) and the eleventh field effect transistor of the first type (N11) is connected between the fifth capacitor (C5) and the third reference potential ($V_{KK}$); wherein a substrate terminal of the ninth and of the eleventh field effect transistors of the first type (N9, N11) is connected to the third reference potential ($V_{KK}$); wherein a gate terminal of the eighth field effect transistor of the first type (N8) and a gate terminal of the eleventh field effect transistor of the first type (N11) are fifth and eighth control terminals, respectively, and are connected in common to the clock output ($\phi A$) of the level converter (PU), and a gate terminal of the ninth field effect transistor of the first type (N9) and of the tenth field effect transistor of the first type (N10) are seventh and eighth control terminals, respectively, and are connected in common to the output of the third inverter stage (I3); and wherein the output of the four-stage voltage multiplier circuit connected to the third reference potential ($V_{KK}$).

4. The voltage multiplier circuit according to claim 3, wherein a sixth capacitor (C6) for smoothing is connected between ground (GND) and the third reference potential ($V_{KK}$).

5. The multi-stage voltage multiplier circuit according to claim 1, wherein the level converter (PU) contains fifth, sixth and seventh field effect transistors of the first type (N5, N6, N7) and first, second and third field effect transistors (P1, P2, P3) of the second type; wherein a first terminal and a substrate terminal of the fifth field effect transistor of the first type (N5) and a first terminal and substrate terminal of the sixth field effect transistor of the first type (N6) are connected to the output of the multi-stage voltage multiplier circuit; wherein a gate terminal of the fifth field effect transistor of the first type (N5), a second terminal of the sixth field effect transistor of the first type (N6) and a first terminal of the first field effect transistor of the second type (P1) are connected in common and form the output ($\phi A$) of the level converter (PU); wherein a gate terminal of the sixth field effect transistor of the first type (N6) is connected to a second terminal of the fifth field effect transistor of the first type (N5) and to a first terminal of the second field effect transistor of the second type (P2); wherein a first terminal and substrate terminal of the seventh field effect transistor of the first type (N7) is connected to ground (GND) and a second terminal of the seventh field effect transistor of the first type (N7) is connected to a gate terminal of the second field effect transistor of the second type (P2) and to a first terminal of the third field effect transistor of the second type (P3); wherein a second terminal and a substrate terminal of the third field effect transistor of the second type (P3), a second terminal and a substrate terminal of the second field effect transistor of the second type (P2) and a second terminal and substrate terminal of the first field effect transistor of the second type (P1) are connected to the first reference potential ($V_{DD}$); wherein a gate terminal of the third field effect transistor of the second type (P3) and a gate terminal of the seventh field effect transistor of the first type (N7) are connected in common and form the clock input ($\phi E$) of the level converter (PU).

6. The multi-stage voltage multiplier circuit according to claim 1, wherein each of the inverter stages contain a further field effect transistor of the first type and a further field effect transistor of the second type; wherein a gate terminal of the further field effect transistor of the first type and a gate terminal of the further field effect transistor of the second type are connected together and form the input of the inverter circuit and a first terminal of the further field effect transistor of the first type and a first terminal of the further field effect transistor of the second type are connected together and form the output of the inverter stage; and wherein a second terminal and a substrate terminal of the further field effect transistor of the first type are each connected to ground (GND) or to the second or third reference potentials ($V_{ss}$, $V_{KK}$) and a second terminal and substrate terminal of the further field effect transistor of the second type are each connected to the first reference potential ($V_{DD}$).

7. The multi-stage voltage multiplier circuit according to claim 6, wherein the field effect transistors of the first type are n-channel field effect transistors and the field effect transistors of the second type are p-channel field effect transistors; and wherein the first reference potential ($V_{DD}$) is a positive supply voltage and the second and third reference potentials ($V_{ss}$, $V_{KK}$) are negative supply voltages.

8. The multi-stage voltage multiplier circuit according to claim 6, wherein the field effect transistors of the first type are p-channel field effect transistors and the field effect transistors of the second type are n-channel field effect transistors; and wherein the first reference potential ($V_{DD}$) is a negative supply voltage and the second and third reference potentials ($V_{ss}$, $V_{KK}$) are positive supply voltages.

9. The multi-stage voltage multiplier circuit according to claim 1, wherein the field effect transistors of the first type are n-channel field effect transistors and the field effect transistors of the second type are p-channel field effect transistors; and wherein the first reference potential ($V_{DD}$) is a positive supply voltage and the second reference potential ($V_{ss}$) is a negative supply voltage.

10. The multi-stage voltage multiplier circuit according to claim 1, wherein the field effect transistors of the first type are p-channel field effect transistors and the field effect transistors of the second type are n-channel field effect transistors; and wherein the first reference potential ($V_{DD}$) is a negative supply voltage and the second reference potential ($V_{ss}$) is a positive supply voltage.

11. The multi-stage voltage multiplier circuit according to claim 3, wherein the field effect transistors of the first type are n-channel field effect transistors and the field effect transistors of the second type are p-channel field effect transistors; and wherein the first reference potential ($V_{DD}$) is a positive supply voltage and the second and third reference potentials ($V_{ss}$, $V_{KK}$) are negative supply voltages.

12. The multi-stage voltage multiplier circuit according to claim 3, wherein the field effect transistors of the first type are p-channel field effect transistors and the field effect transistors of the second type are n-channel field effect transistors; and wherein the first reference potential ($V_{DD}$) is a negative supply voltage and the second and third reference potentials ($V_{ss}$, $V_{KK}$) are positive supply voltages.

13. The multi-stage voltage multiplier circuit according to claim 5, wherein the field effect transistors of the first type are n-channel field effect transistors and the field effect transistors of the second type are p-channel field effect transistors; and wherein the first reference potential ($V_{DD}$) is a positive supply voltage and the second reference potential ($V_{ss}$) is a negative supply voltage.

14. The multi-stage voltage multiplier circuit according to claim 5, wherein the field effect transistors of the first type are p-channel field effect transistors and the field effect transistors of the second type are n-channel field effect transistors; and wherein the first reference potential ($V_{DD}$) is a negative supply voltage and the second reference potential ($V_{ss}$) is a positive supply voltage.

15. A multi-stage voltage multiplier circuit having a level converter (PU), the multi-stage voltage multiplier circuit having a first stage (ST1) containing a first capacitor (C1), a first inverter stage (I1), and first and second field effect transistor (N1, N2) of a first type, whereby a first terminal of the first capacitor (C1) is connected to an output of the first inverter stage (I1) and a second terminal of the first capacitor (C1) is connected to ground (GND) via the first field effect transistor of the first type (N1), whereby the second terminal of the first capacitor (C1) is also connected to a second reference potential ($V_{ss}$) via the second field effect transistor of the first type (N2) and the first inverter stage (I1) is connected between the first reference potential ($V_{DD}$) and ground (GND), whereby an input of the first inverter stage (I1) forms an input of the first stage and a gate terminal of the first field effect transistor of the first type (N1) forms a first control input and a gate terminal of the second field effect transistor of the first type (N2) forms a second control input of the first stage, whereby a substrate terminal of the first field effect transistor of the first type (N1) is connected to the second terminal of the first capacitor (C1) and a substrate terminal of the second field effect transistor of the first type (N2) is connected to the second reference potential ($V_{ss}$), comprising a second stage (ST2) having a second capacitor (C2), a second inverter stage (I2), and third and fourth field effect transistors of the first type (N3, N4); a first terminal of the second capacitor (C2) connected to an output of the second inverter stage (I2) and a second terminal of the second capacitor (C2) connected to ground (GND) via the third field effect transistor of the first type (N3); the second terminal of the second capacitor (C2) also connected to the second reference potential ($V_{ss}$) via the fourth field effect transistor of the first type (N4) and the second inverter stage (I2) connected between the first reference potential ($V_{DD}$) and ground (GND); an input of the second inverter stage (I2) forming an input of the second stage, a gate terminal of the third field effect transistor of the first type (N3) being a third control input and a gate terminal of the fourth field effect transistor of the first type (N4) being a fourth control input; a substrate terminal of the third field effect transistor of the first type (N3) connected to the second terminal of the second capacitor (C2) and a substrate terminal of the fourth field effect transistor of the first type (N4) connected to the second reference potential ($V_{ss}$); a clock output ($\phi A$) of the level converter (PU) connected to an input of a third inverter stage (I3) and to the first control input and fourth control input, and the second control input and third control input connected to an output of the third inverter stage (I3); the input of the first stage (ST1) connected to an output of a fourth inverter stage (I4) and the input of the second stage (ST2) connected to an input of the fourth inverter stage (I4) and to a clock input ($\phi E$) of the level converter (PU); the fourth inverter stage (I4) connected between the first reference potential ($V_{DD}$)

and ground (GND); the input of the fourth inverter stage (I4) forming a clock input ($\phi$) of the multi-stage voltage multiplier circuit; the third inverter stage (I3) connected between an output of the voltage multiplier circuit and the first reference potential ($V_{DD}$); the level converter (PU) connected to the first and second reference potential ($V_{DD}$, $V_{ss}$) and to ground (GND); and the output of the two-stage voltage multiplier circuit connected to the second reference potential ($V_{ss}$); the first and second stages (ST1, ST2) being followed by third and fourth stages (ST3, ST4); the third and fourth stages (ST3, ST4) having a fifth and sixth inverter stages (I5, I6), an eighth, ninth, tenth and eleventh field effect transistor of the first type (N8, N9, N10 and N11) and fourth and fifth capacitors (C4, C5); the second and third control inputs connected to an input of the fifth inverter stage (I5) and the first and fourth control terminals connected to an input of the sixth inverter stage (I6); the fifth and sixth inverter stages each connected between the first reference potential ($V_{DD}$) and the second reference potential ($V_{ss}$); the fourth capacitor (C4) having a first terminal connected to an output of the fifth inverter stage (I5) and having a second terminal connected to the second reference potential ($V_{ss}$) via the eighth field effect transistor of the first type (N8); the fifth capacitor (C5) having a first terminal connected to an output of the sixth inverter stage (I6) and having a second terminal connected to the second reference potential ($V_{ss}$) via the tenth field effect transistor of the first type (N10); a substrate terminal of the eighth field effect transistor of the first type (N8) connected to the second terminal of the fourth capacitor (C4) and a substrate terminal of the tenth field effect transistor of the first type (N10) connected to the second terminal of the fifth capacitor (C5); the ninth field effect transistor of the first type (N9) connected between the fourth capacitor (C4) and a third reference potential ($V_{KK}$) and the eleventh field effect transistor of the first type (N11) connected between the fifth capacitor (C5) and the third reference potential ($V_{KK}$); a substrate terminal of the ninth and of the eleventh field effect transistors of the first type (N9, N11) connected to the third reference potential ($V_{KK}$); a gate terminal of the eighth field effect transistor of the first type (N8) and a gate terminal of the eleventh field effect transistor of the first type (N11) being fifth and eighth control terminals, respectively, and connected in common to the clock output ($\phi$A) of the level converter (PU), and a gate terminal of the ninth field effect transistor of the first type (N9) and of the tenth field effect transistor of the first type (N10) being seventh and eighth control terminals, respectively, and connected in common to the output of the third inverter stage (I3); and the output of the four-stage voltage multiplier circuit connected to the third reference potential ($V_{KK}$).

16. The multi-stage voltage multiplier circuit according to claim 15, wherein a third capacitor (C3) for smoothing is connected between ground (GND) and the second reference potential ($V_{ss}$); and a sixth capacitor (C6) for smoothing is connected between ground (GND) and the third reference potential ($V_{KK}$).

17. The multi-stage voltage multiplier circuit according to claim 15, wherein the level converter (PU) contains fifth, sixth and seventh field effect transistors of the first type (N5, N6, N7) and first, second and third field effect transistors (P1, P2, P3) of the second type; wherein a first terminal and substrate terminal of the fifth field effect transistor of the first type (N5) and a first terminal and substrate terminal of the sixth field effect transistor of the first type (N6) are connected to the output of the multi-stage voltage multiplier circuit; wherein a gate terminal of the fifth field effect transistor of the first type (N5), a second terminal of the sixth field effect transistor of the first type (N6) and a first terminal of the first field effect transistor of the second type (P1) are connected in common and form the output ($\phi$A) of the level converter (PU); wherein a gate terminal of the sixth field effect transistor of the first type (N6) is connected to a second terminal of the fifth field effect transistor of the first type (N5) and to a first terminal of the second field effect transistor of the second type (P2); wherein a first terminal and substrate terminal of the seventh field effect transistor of the first type (N7) is connected to ground (GND) and a second terminal of the seventh field effect transistor of the first type (N7 is connected to a gate terminal of the second field effect transistor of the second type (P2) and to a first terminal of the third field effect transistor of the second type (P3); wherein a second terminal and a substrate terminal of the third field effect transistor of the second type (P3), a second terminal and a substrate terminal of the second field effect transistor of the second type (P2) and a second terminal and substrate terminal of the first field effect transistor of the second type (P1) are connected to the first reference potential ($V_{DD}$); wherein a gate terminal of the third field effect transistor of the second type (P3) and a gate terminal of the seventh field effect transistor of the first type (N7) are connected in common and form the clock input ($\phi$E) of the level converter (PU).

18. The multi-stage voltage multiplier circuit according to claim 15, wherein each of the inverter stages contain a further field effect transistor of the first type and a further field effect transistor of the second type; wherein a gate terminal of the further field effect transistor of the first type and a gate terminal of the further field effect transistor of the second type are connected together and form the input of the inverter circuit and a first terminal of the further field effect transistor of the first type and a first terminal of the further field effect transistor of the second type are connected together and form the output of the inverter stage; and wherein a second terminal and a substrate terminal of the further field effect transistor of the first type are each connected to ground (GND) or to the second or third reference potentials ($V_{ss}$, $V_{KK}$) and a second terminal and substrate terminal of the further field effect transistor of the second type are each connected to the first reference potential ($V_{DD}$).

19. A multi-stage voltage multiplier circuit having a level converter (PU), the multi-stage voltage multiplier circuit having a first stage (ST1) containing a first capacitor (C1), a first inverter stage (I1), and first and second field effect transistor (N1, N2) of a first type, whereby a first terminal of the first capacitor (C1) is connected to an output of the first inverter stage (I1) and a second terminal of the first capacitor (C1) is connected to ground (GND) via the first field effect transistor of the first type (N1), whereby the second terminal of the first capacitor (C1) is also connected to a second reference potential ($V_{ss}$) via the second field effect transistor of the first type (N2) and the first inverter stage (I1) is connected between the first reference potential ($V_{DD}$) and ground (GND), whereby an input of the first inverter stage (I1) forms an input of the first stage and a gate terminal of the first field effect transistor of the first type (N1) forms a first control input and a gate terminal of the second field effect transistor of the first type (N2) forms a second control input of the first stage, whereby a substrate terminal of the first field effect transistor of the first type (N1) is connected to the second terminal of the first capacitor (C1) and a substrate terminal of the second field effect transistor of the first type (N2) is connected to the second reference potential ($V_{ss}$), comprising a second stage (ST2) having a second capacitor (C2), a second inverter stage (I2), and third and fourth field effect transistors of the first type (N3, N4); a first terminal of the second capacitor (C2) connected to an output of the second inverter stage (I2) and a second terminal of the second capacitor (C2) connected to ground (GND) via the third field effect transistor of the first type (N3); the second terminal of the second capacitor (C2) also connected to the second reference potential ($V_{ss}$) via the fourth field effect transistor of the first type (N4) and the second inverter stage (I2) connected between the first reference potential ($V_{DD}$) and ground (GND); an input of the second inverter stage (I2) forming an input of the second stage, a gate terminal of the third field effect transistor of the first type (N3) being a third control input and a gate terminal of the fourth field effect transistor of the first type (N4) being a fourth control input; a substrate terminal of the third field effect transistor of the first type (N3) connected to the second terminal of the second capacitor (C2) and a substrate terminal of the fourth field effect transistor of the first type (N4) connected to the second reference potential ($V_{ss}$); a clock output ($\phi A$) of the level converter (PU) connected to an input of a third inverter stage (I3) and to the first control input and fourth control input, and the second control input and third control input connected to an output of the third inverter stage (I3); the input of the first stage (ST1) connected to an output of a fourth inverter stage (I4) and the input of the second stage (ST2) connected to an input of the fourth inverter stage (I4) and to a clock input ($\phi E$) of the level converter (PU); the fourth inverter stage (I4) connected between the first reference potential ($V_{DD}$) and ground (GND); the input of the fourth inverter stage (I4) forming a clock input ($\phi$) of the multi-stage voltage multiplier circuit; the third inverter stage (I3) connected between an output of the voltage multiplier circuit and the first reference potential ($V_{DD}$); the level converter (PU) connected to the first and second reference potential ($V_{DD}$, $V_{ss}$) and to ground (GND); and the output of the two-stage voltage multiplier circuit connected to the second reference potential ($V_{ss}$); the level converter (PU) containing fifth, sixth and seventh field effect transistors of the first type (N5, N6, N7) and first, second and third field effect transistors (P1, P2, P3) of the second type; a first terminal and a substrate terminal of the fifth field effect transistor of the first type (N5) and a first terminal and substrate terminal of the sixth field effect transistor of the first type (N6) connected to the output of the multi-stage voltage multiplier circuit; a gate terminal of the fifth field effect transistor of the first type (N5), a second terminal of the sixth field effect transistor of the first type (N6) and a first terminal of the first field effect transistor of the second type (P1) connected in common and forming the output ($\phi A$) of the level converter (PU); a gate terminal of the sixth field effect transistor of the first type (N6) connected to a second terminal of the fifth field effect transistor of the first type (N5) and to a first terminal of the second field effect transistor of the second type (P2); a first terminal and substrate terminal of the seventh field effect transistor of the first type (N7) connected to ground (GND) and a second terminal of the seventh field effect transistor of the first type (N7) connected to a gate terminal of the second field effect transistor of the second type (P2) and to a first terminal of the third field effect transistor of the second type (P3); a second terminal and a substrate terminal of the third field effect transistor of the second type (P3), a second terminal and a substrate terminal of the second field effect transistor of the second type (P2) and a second terminal and substrate terminal of the first field effect transistor of the second type (P1) connected to the first reference potential ($V_{DD}$); a gate terminal of the third field effect transistor of the second type (P3) and a gate terminal of the seventh field effect transistor of the first type (N7) connected in common and forming the clock input ($\phi E$) of the level converter (PU).

20. The multi-stage voltage multiplier circuit according to claim 19, wherein a third capacitor (C3) for smoothing is connected between ground (GND) and the second reference potential ($V_{ss}$).

21. The multi-stage voltage multiplier circuit according to claim 19 wherein the first and second stages (ST1, ST2) are followed by third and fourth stages (ST3, ST4); wherein the third and fourth stages (ST3, ST4) have fifth and sixth inverter stages (I5, I6), an eighth, ninth, tenth and eleventh field effect transistor of the first type (N8, N9, N10 and N11) and fourth and fifth capacitors (C4, C5); wherein the second and third control inputs are connected to an input of the fifth inverter stage (I5 and the first and fourth control terminals are connected to an input of the sixth inverter stage (I6); wherein the fifth and sixth inverter stages are each connected between the first reference potential ($V_{DD}$) and the second reference potential ($V_{ss}$); wherein the fourth capacitor (C4) has a first terminal connected to an output of the fifth inverter stage (I5) and has a second terminal connected to the second reference potential ($V_{ss}$) via the eighth field effect transistor of the first type (N8); wherein the fifth capacitor (C5) has a first terminal connected to an output of the sixth inverter stage (I6) and has a second terminal connected to the second reference potential ($V_{ss}$) via the tenth field effect transistor of the first type (N10); wherein a substrate terminal of the eighth field effect transistor of the first type (N8) is connected to the second terminal of the fourth capacitor (C4) and a substrate terminal of the tenth field effect transistor of the first type (N10) is connected to the second terminal of the fifth capacitor (C5); wherein the ninth field effect transistor of the first type (N9) is connected between the fourth capacitor (C4) and a third reference potential ($V_{KK}$) and the eleventh field effect transistor of the first type (N11) is connected between the fifth capacitor (C5) and the third reference potential ($V_{KK}$); wherein a substrate terminal of the ninth and of the eleventh field effect transistors of the first type (N9, N11) is connected to the third reference potential ($V_{KK}$); wherein a gate terminal of the eighth field effect transistor of the first type (N8) and a gate terminal of the eleventh field effect transistor of the first type (N11) are fifth and eighth control terminals, respectively, and are connected in common to the clock output ($\phi A$) of the level converter (PU), and a gate terminal of the ninth field effect transistor of the first type (N9) and of the tenth field effect transistor of the first type (N10) are seventh and eighth control terminals, respectively, and are connected in common to the output of the third inverter stage (I3); and wherein the output of the four-stage voltage multiplier circuit connected to the third reference potential ($V_{KK}$).

22. The voltage multiplier circuit according to claim 19, wherein a sixth capacitor (C6) for smoothing is connected between ground (GND) and the third reference potential ($V_{KK}$).

23. The multi-stage voltage multiplier circuit according to claim 19, wherein each of the inverter stages contain a further field effect transistor of the first type and a further field effect transistor of the second type; wherein a gate terminal of the further field effect transistor of the first type and a gate terminal of the further field effect transistor of the second type are connected together and form the input of the inverter circuit and a first terminal of the further field effect transistor of the first type and a first terminal of the further field effect transistor of the second type are connected together and form the output of the inverter stage; and wherein a second terminal and a substrate terminal of the further field effect transistor of the first type are each connected to ground (GND) or to the second or third reference potentials ($V_{SS}$, $V_{KK}$) and a second terminal and substrate terminal of the further field effect transistor of the second type are each connected to the first reference potential ($V_{DD}$).

* * * * *